United States Patent [19]
Kaady

[11] Patent Number: 5,898,966
[45] Date of Patent: May 4, 1999

[54] CAR WASH SIDE BRUSHING APPARATUS HAVING TWO INDEPENDENTLY ADJUSTABLE BRUSHES

[76] Inventor: Charles M. Kaady, 1534 SW. Cardinell Dr., Portland, Oreg. 97201

[21] Appl. No.: 08/896,113

[22] Filed: Jul. 17, 1997

[51] Int. Cl.⁶ ........................................................ B60S 3/00
[52] U.S. Cl. .............................................................. 15/53.2
[58] Field of Search .................... 15/53.1, 53.2, 15/53.3, 97.3, DIG. 2; 451/182, 190, 194

[56] References Cited

U.S. PATENT DOCUMENTS

| | | |
|---|---|---|
| 3,090,981 | 5/1963 | Vani et al. . |
| 3,366,986 | 2/1968 | Weigele et al. ........................... 15/21.1 |
| 3,593,357 | 7/1971 | Oldham . |
| 3,793,667 | 2/1974 | Capra ........................................ 15/21.1 |
| 3,926,663 | 12/1975 | Gray ............................................ 134/6 |
| 3,943,590 | 3/1976 | Hanna . |
| 4,021,877 | 5/1977 | Miner ....................................... 15/53.1 |
| 4,225,995 | 10/1980 | Ennis ....................................... 15/53.1 |
| 4,354,291 | 10/1982 | Ennis ....................................... 15/53.1 |
| 4,756,041 | 7/1988 | Hanna . |
| 4,777,688 | 10/1988 | Seamster, Jr. . |
| 5,056,267 | 10/1991 | Nicely et al. . |

FOREIGN PATENT DOCUMENTS

| | | | |
|---|---|---|---|
| 12683 | 6/1980 | European Pat. Off. ............ | 15/DIG. 2 |
| 404176762 | 6/1992 | Japan ...................................... | 15/53.1 |

*Primary Examiner*—Robert Warden
*Assistant Examiner*—Andrew Aldag
*Attorney, Agent, or Firm*—Klarquist Sparkman Campbell Leigh & Whinston, LLP

[57] ABSTRACT

Car wash side brushing apparatus includes a rotatable vertical shaft to the top and bottom of which is mounted a horizontal arm supporting a rotatable washer adjacent its end. The end of each horizontal arm is rotatable about its longitudinal axis with respect to the attached end such that the longitudinal axis of each washer is tilted to place one of the upper and lower ends thereof more closely to the vertical side surface of a vehicle than the other end. In addition, the upper end of the vertical shaft is rotatable axially with respect to the lower end thereof such that one of the horizontal arms leads the other by a selected angle measured in a horizontal plane.

9 Claims, 5 Drawing Sheets

CAR WASH SIDE BRUSHING APPARATUS HAVING TWO INDEPENDENTLY ADJUSTABLE BRUSHES

FIELD OF THE INVENTION

This invention relates to apparatus for washing vehicles and, more particularly, to apparatus for washing the upright surfaces of vehicles.

BACKGROUND OF THE INVENTION

Many new vehicles have upright side surfaces that are highly curved, giving the vehicles almost an egg-shaped appearance when viewed from the front or the rear. This particular contour has presented a challenge to existing car wash side brushing apparatus, which often is incapable of making efficient contact with the upper and lower portions of the vehicle sides.

Heretofore, a number of prior art devices and constructions have been employed for cleaning the upright surfaces of curved, indented or otherwise inwardly sloping side surfaces of vehicles. One such device is disclosed in Hanna, U.S. Pat. No. 4,756,041. In such a device an upper washer rotatable about a first upright axis is disposed above and coupled to a lower washer rotatable about a second upright axis so as to permit limited lateral shifting of the first and second axes relative to one another. This lateral shifting capability allows either washer to move independently a limited amount toward or away from a vehicle more closely to follow the surfaces of the vehicle to clean those surfaces. The more highly curved side surfaces of present day vehicles, however, have severely diminished the capacity of the '041 apparatus to achieve satisfactory cleaning in high volume car washing installations.

Another apparatus designed to wash portions of the sides of a vehicle while simultaneously washing the lower side portions, commonly known as "rocker panels," is disclosed in Vani et al., U.S. Pat. No. 3,090,981. This apparatus, however, employing longitudinally separately mounted vertical and angularly disposed brushes, perforce requires a longer car wash bay to service the vehicles. Another apparatus which sought to address the problem of the highly curved side surface vehicle is disclosed in Nicely et al., U.S. Pat. No. 5,056,267. This apparatus employs separately mounted, independently pivotal and individually powered brushes in a highly complex assembly. The brushes, however, are not individually angularly adjustable about the longitudinal axes of their supporting brackets as might be required by evolving auto body designs.

Seamster, Jr., U.S. Pat. No. 4,777,688, discloses apparatus comprising independently driven upper and lower side brushes rotatable on a single brush axle. The axle is supported by horizontal arms which are themselves mounted to the top and bottom ends of a support tube. The tube is canted towards the interior of the wash bay at its upper end. Such apparatus, of course, is ineffective as respects vehicles having highly curved side surfaces.

Oldham, U.S. Pat. No. 3,593,357, discloses another vehicle side washing apparatus including separately driven window and side brushes mounted on a common frame. The assembly includes a side brush rotatable by one hydraulic motor on a first vertical axis and a second window brush rotatable on a second axis inclined from the vertical toward a passing vehicle and controlled by a second motor. Because the axes are fixed relative to each other, engagement between the washer elements and severely curved surfaces of vehicles can be inhibited.

Therefore, a need exists for an improved vehicle side washing apparatus particularly designed for washing the generally upright surfaces of vehicles which have highly curved side surfaces.

SUMMARY OF THE INVENTION

In accordance with the invention, an apparatus for washing the generally upright surfaces of a vehicle includes an independently powered upper washer rotatable about a first axis and supported by a first horizontal arm, and a second independently powered lower washer rotatable about a second axis and supported by a second horizontal arm. Both horizontal arms are attached to a vertical rotatable shaft for rotation therewith. Both horizontal arms supporting the brushes are rotatable about their respective longitudinal axes such that the axes about which the washers rotate form a desired angle with each other in a plane defined thereby.

Thus, each of the upper and lower washers can have its rotational axis independently adjusted to achieve a desired angle of attack with respect to vehicles passing thereby, and each washer can be independently driven at a desired rotational speed. Because the washers are supported by horizontal arms attached to a single rotatable shaft, the lower washer on its horizontal arm can regulate the positions of both washers as respects the front, side and rear of the vehicle, thereby to prevent the possibility of damage.

Additionally, the invention contemplates arranging the horizontal arms which support the washers such that their projections on a horizontal plane form an angle with respect to each other. Such allows the positions of the two washers to be further adjusted if the desired angle of attack or tilt of either washer positions a portion thereof either an excessive distance from the vehicle surface or from the other washer.

DETAILED DESCRIPTION OF A PREFERRED EMBODIMENT

Figure 6:
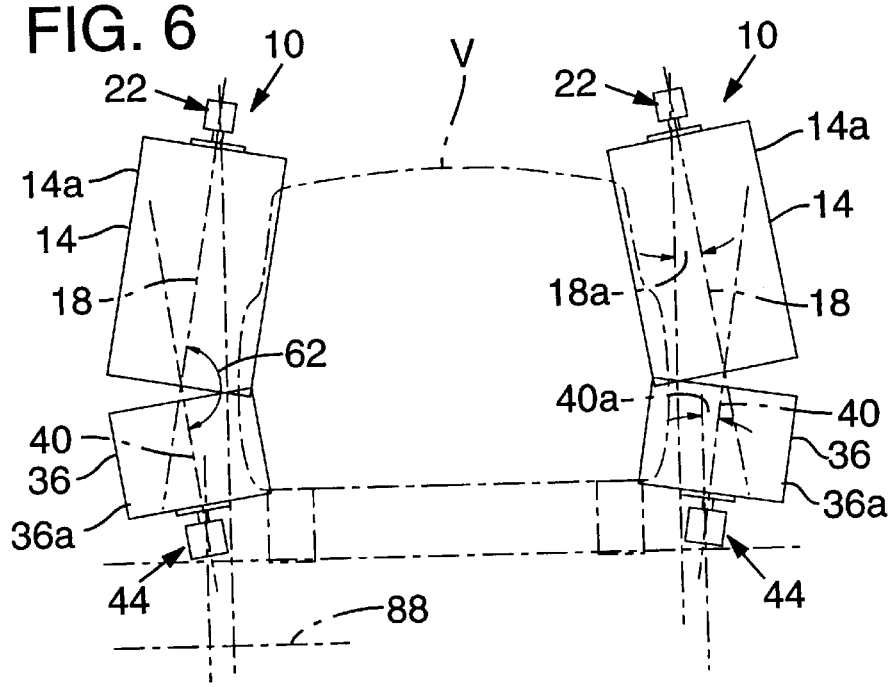
FIG. 6 is an end view of a vehicle passing by the apparatus during the washing process and illustrates a possible orientation of upper and lower washers with respect to the vehicle.
Figure 7:
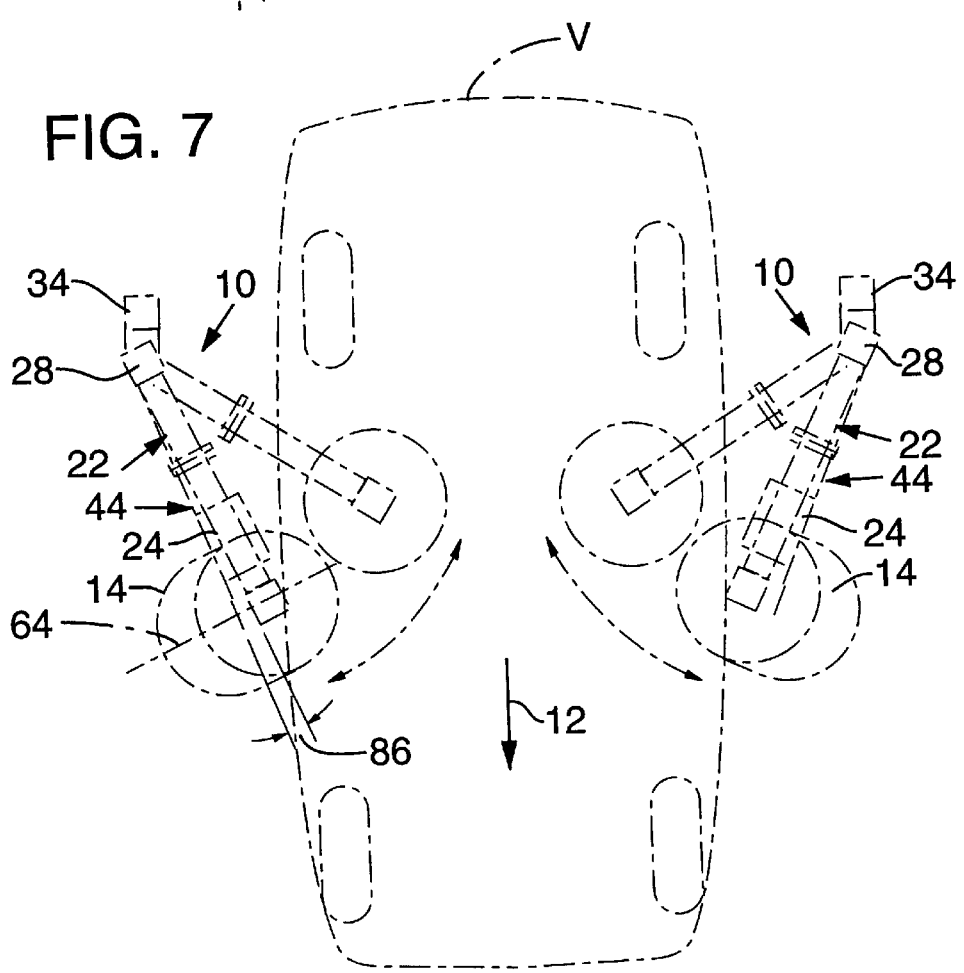
FIG. 7 is a top view of the vehicle and the apparatus shown in FIG. 6.

Referring to the drawings, FIGS. 6 and 7 show a pair of washing apparatus 10 in position to wash the upright surfaces of a vehicle V traveling along a path in the direction of the arrow 12. Typically, vehicle V is transported by a conveyor (not shown) between the pair of apparatus. Each apparatus 10 is a substantially identical, but opposite hand version of the other. Therefore, only one needs to be described in detail.

Figure 1:
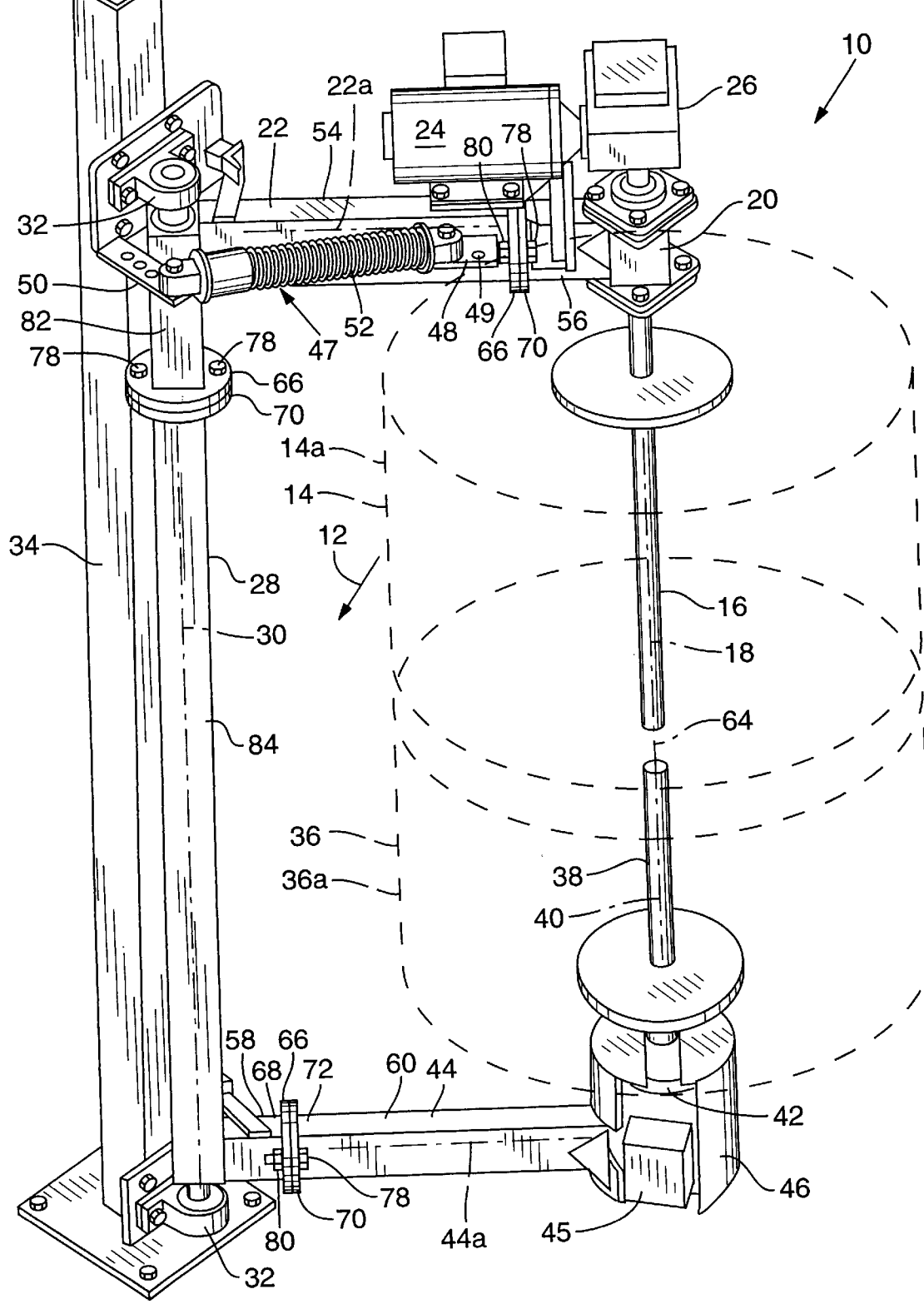
FIG. 1 is a perspective view of one of a pair of washing apparatus in accordance with the present invention.
Figure 2:
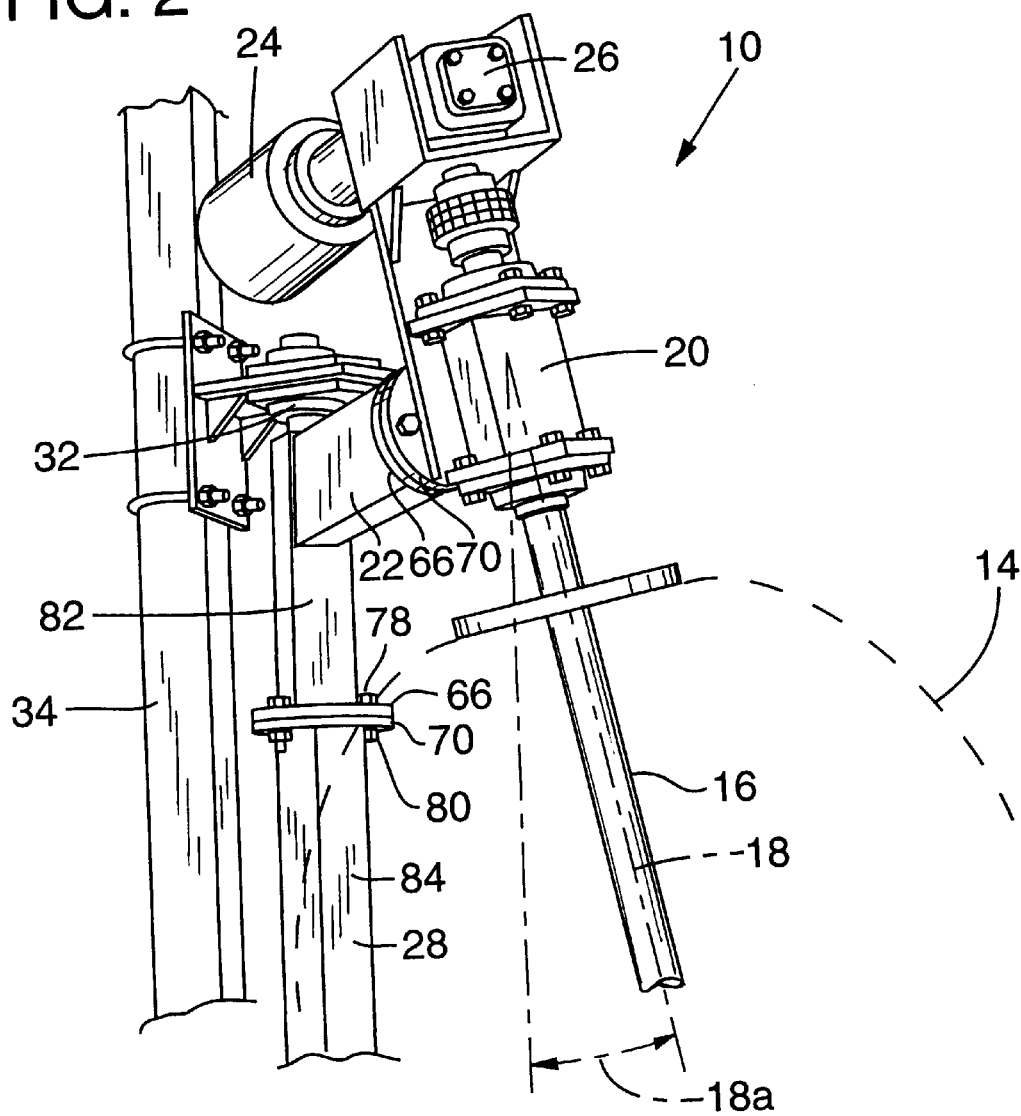
FIG. 2 is a perspective view of the upper part of the apparatus shown in FIG. 1.
Figure 3:
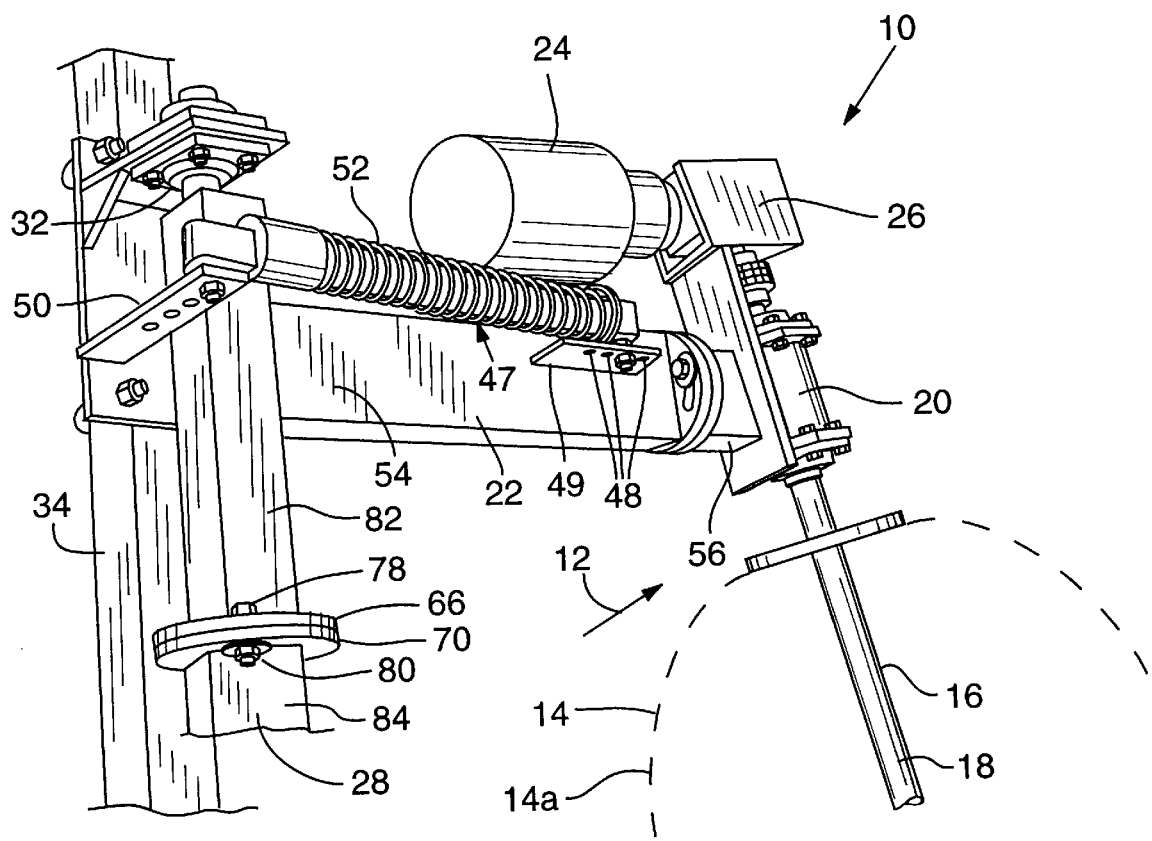
FIG. 3 is a perspective view of the part of the apparatus shown in FIG. 2 taken from a different vantage point.

Referring to FIGS. 1, 2 and 3, each apparatus 10 includes an upper washer 14, preferably about 42 inches long, of conventional design having a central core 16 with an axis 18. Washer 14 is supported for rotation on a bearing 20 by an upper horizontal arm 22. Washer 14 is powered by an electric motor 24 through an angle drive 26. Arm 22 is attached to a vertical shaft 28 (see FIG. 2) having a vertical longitudinal axis 30 (see FIG. 1) rotatably supported in top and bottom bearings 32 connected to the framework 34 of the vehicle wash.

A lower washer 36, also of conventional design and preferably about 28 inches long, having a central core 38 with an axis 40, is supported for rotation on a bearing 42 by a lower horizontal arm 44. See FIG. 1. Washer 36 is separately powered by an electric motor 45 which is protected by a cylindrical shield 46. See FIG. 4. Lower horizontal arm 44 is also attached to vertical shaft 28, as shown.

A conventional spring actuated biasing and shock assembly 47 is adjustably fastened at its distal end to a plate 48 disposed on the downstream side of upper horizontal arm 22. Plate 48 is provided with adjustment holes 49. The assembly 47 is fastened at its other (proximal) end to a similarly apertured plate 50 attached to framework 34. The assembly 47 includes a spring element 52 adapted to urge washers 14 and 36 against the sides of vehicle V. Assembly 47 permits the washers to pivot away from the path of vehicle V as the vehicle travels through the car wash, the spring element 52 being compressed as vehicle V presses against the washers, the spring element 52 then extending as vehicle V passes by.

Upper horizontal arm 22 is fabricated in two sections. See FIGS. 1, 2 and 3. A proximal portion 54 is welded to the upper end of vertical shaft 28. A distal portion 56, attached to proximal portion 54 by means to be hereinafter described, is independently axially rotatable with respect to portion 54. See FIG. 3. Lower horizontal arm 44 is also fabricated in two sections, a proximal portion 58 welded to the lower end of vertical shaft 28 and a distal portion 60 independently axially rotatable with respect to portion 58. See FIGS. 1 and 4.

Rotating distal portions 56 and 60 with respect to their respective proximal portions 54 and 58 permits the car wash operator to establish an individual operational angle of attack, with respect to the vertical, for each washer. These angles are angle 18a as respects axis 18 of upper washer 14 and angle 40a as respects axis 40 of lower washer 36. See FIG. 6. Typically, the adjustments position the upper part 14a of upper washer 14 and the lower part 36a of lower washer 36 more closely to the centerline of vehicle V. Again see FIG. 6. Thus, axes 18 and 40 of upper and lower washers 14 and 36 are not colinear, but they form an angle 62 with each other in a plane 64 which they perforce define. See FIG. 7.

Figure 4:
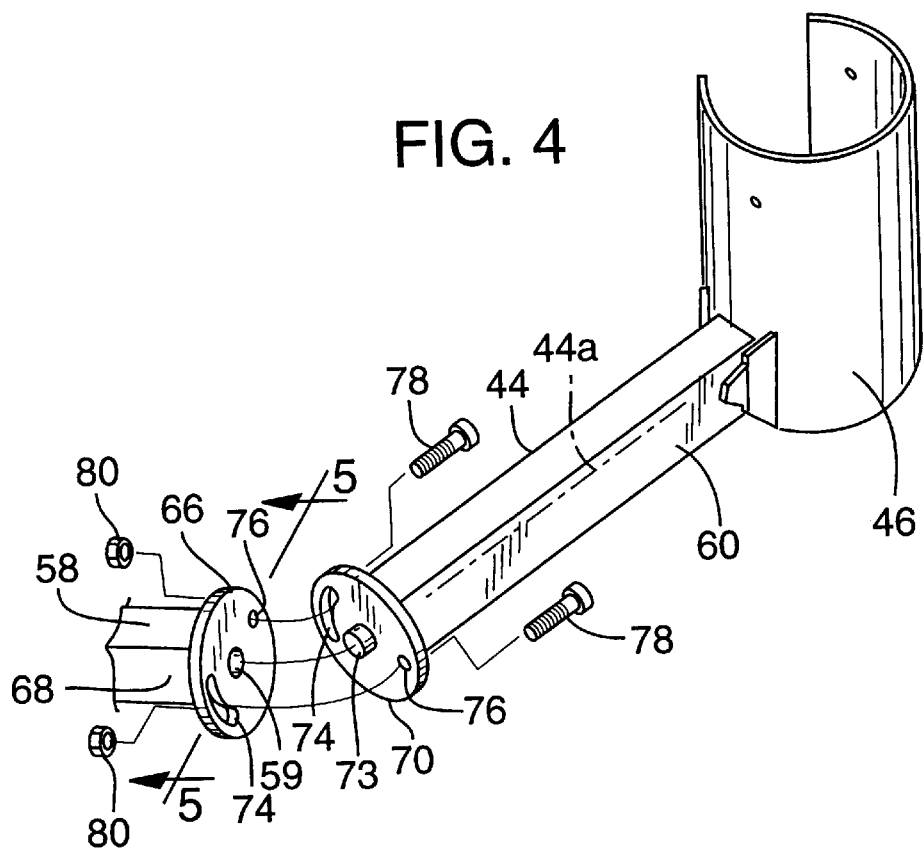
FIG. 4 is an exploded perspective view of the horizontal arm which supports the lower washer, showing a preferred means of achieving a desired angle of attack or tilt of the lower washer as it is supported by the arm.
Figure 5:
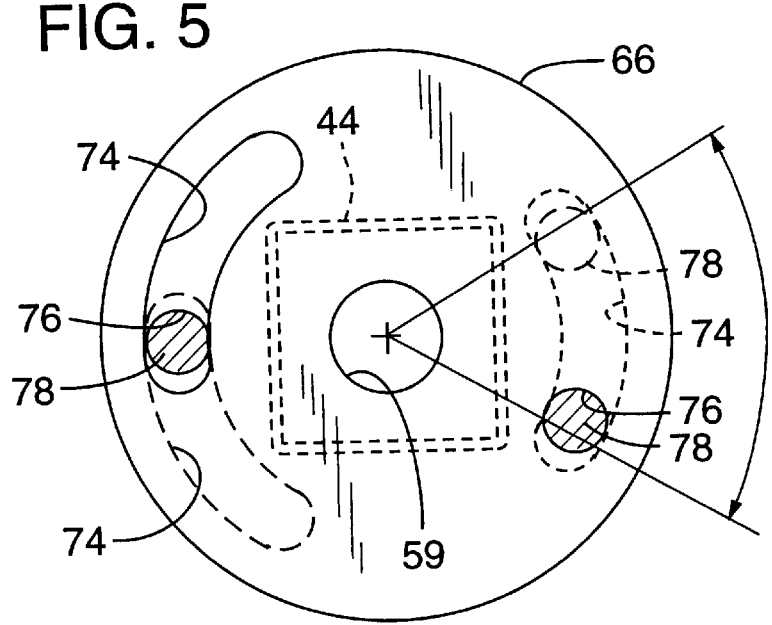
FIG. 5 is a view taken of the plates shown in FIG. 4.

Longitudinal axial rotatability of upper and lower horizontal arms 22 and 44 is achieved by a system which will be described as respects lower arm 44. The same system is used for upper arm 22. FIGS. 4 and 5 illustrate the system used for lower arm 22.

A first plate 66 is mounted on the distal end 68 of proximal portion 58 of lower horizontal arm 44. Plate 66 includes an aperture 59 located centrally therein. A second plate 70 is mounted on the proximal end 72 of distal portion 60 of lower horizontal arm 44. Plate 70 includes an alignment dowel 73 protruding centrally therefrom. Each of plates 66 and 70 includes an arcuate slot 74 adjacent its periphery and another aperture 76 located opposite arcuate slot 74. Plates 66 and 70 are welded to the respective portions 58 and 60 of arm 44 such that they are in facing mating relation, as shown, with the slot 74 of one plate in register with the aperture 76 in the other, and such that alignment dowel 73 in plate 70 protrudes into aperture 59 in plate 66. The plates 66 and 70 can then be rotated to achieve the desired axial rotation of portions 58 and 60 with respect to each other. Plates 66 and 70 are then fastened together by threaded fasteners 78 and nuts 80. By this means plate 70 can be rotated with respect to plate 66 about the horizontal axis 44a of lower arm 44 to achieve a desired axial rotation of the distal portion 60 of lower arm 44 and a consequent desired angle of attack 40a of lower washer 36. See FIG. 6.

Plates identical to plates 66 and 70 are welded to the proximal and distal portions 54 and 56 of upper horizontal arm 22 to achieve a desired axial rotation of arm 22. By this means the distal portion 56 of upper horizontal arm 22 can be rotated with respect to the proximal portion 54 thereof to achieve a desired angle of attack 18a of upper washer 14. See FIG. 6. Thus, the angle 62 between the axes 18 and 40 of upper and lower washers 14 and 36 is achieved.

Axial rotation of distal portion 56 of horizontal arm 22 places the upper portion 14a of upper washer 14 closer to the side of vehicle V than the lower portion, but it perforce places the lower portion of the longer upper washer 14 further from the vehicle side, and further from the upper portion of the shorter lower washer 36. If the degree of tilt places the lower portion of washer 14 too far from the vehicle side or too far from the upper portion of washer 36, the apparatus permits axial rotation of the top portion of shaft 28 with respect to the bottom portion thereof to achieve a final desired positioning.

As shown in FIGS. 1, 2 and 3, shaft 28 is constructed such that the top portion 82 can be rotated axially with respect to the bottom portion 84 to achieve an angle 86 between the projections of the axes 22a and 44a of arms 22 and 44 on a horizontal plane 88. See FIGS. 6 and 7. Typically, such a rotation will achieve an orientation such that lower arm 44 leads upper arm 22 in the direction of vehicle travel 12 (see FIG. 7), such that the upper portion of the shorter lower washer 36 is positioned more closely to the lower portion of the longer washer 14.

To achieve this desired longitudinal axial rotatability of vertical shaft 28, the shaft is constructed in two parts, as above set forth: an upper portion 82 and a lower portion 84. A pair of plates 66 and 70, as hereinabove described, are welded to portions 82 and 84, one such plate to the lower end of upper portion 82 and another such plate to the upper end of lower portion 84. Again, each of plates 66 and 70 comprises an arcuate slot 74 and an aperture 76 opposite slot 74. The plates are placed in facing mating relation and fastened together with threaded fasteners 78 and nuts 80, with the arcuate slot 74 of one in register with the aperture 76 of the other and with a central alignment dowel 73 received in a central aperture 59. By this means a plate 66 welded to the lower end of upper portion 82 of shaft 28 can be rotated about longitudinal axis 30 of shaft 28, before being securely fastened to a plate 70 welded to the upper end of lower portion 84 of shaft 28 to achieve the desired horizontal angle 86 between axes 22a and 44a of the respective horizontal arms 22 and 44. See FIG. 7.

Thus, my invention provides upper and lower washers each of which can have its rotational axis independently adjusted to achieve a desired angle of attack or tilt with respect to vehicles being washed, and each washer can be independently driven at a desired rotational speed. Because the washers are supported by horizontal arms attached to a single rotatable shaft, the lower washer on its horizontal arm regulates the positions of both of the washers with respect to the side of the vehicle, thereby to prevent the possibility of damaging the vehicle. The positions of the two washers can also be adjusted if the desired tilt of either washer positions a portion thereof an excessive distance from the vehicle side or from the other washer.

Having illustrated and described the principles of my invention with reference to one preferred embodiment, it should be apparent to those persons skilled in the art that the invention may be modified in arrangement and detail without departing from such principles.

I claim:

1. Apparatus for washing the generally upright surfaces of a vehicle, comprising:

an upper washer rotatable about a first axis;

a first horizontal arm supporting the upper washer for rotation about the first axis;

a lower washer rotatable about a second axis;

a second horizontal arm supporting the lower washer for rotation about the second axis;

a rotatable shaft having a longitudinal vertical axis, the first and second horizontal arms being attached to the rotatable shaft for rotation therewith about the longitudinal vertical axis;

each of the first and second horizontal arms comprising a portion rotatable about its respective longitudinal axis, whereby the first axis of the upper washer forms a first angle with respect to the second axis of the lower washer; and means for independently rotating the upper and lower washers about the respective first and second axes.

2. The apparatus of claim 1, further comprising means for independently rotating the portion of each of the first and second horizontal arms about their respective horizontal axes to establish the first angle.

3. The apparatus of claim 1, wherein each of the first and second horizontal arms comprises a proximal portion attached to the rotatable shaft and a distal portion independently axially rotatable with respect to its respective proximal portion, the upper and lower washers being supported on the respective distal portions of the first and second horizontal arms.

4. Apparatus as in claim 3, further comprising:

a first plate mounted on the distal end of the proximal portion of each of the first and second horizontal arms;

a second plate mounted on the proximal end of the distal portion of each of the first and second horizontal arms;

the first and second plates each comprising an arcuate slot adjacent its periphery and an aperture opposite thereto, the first and second plates being in facing mating relation, the slot of one of the plates being in register with the aperture in the other of the plates; and means to fasten the first and second plates together, the fastening means passing through the mating slots and apertures, whereby the second plate can be rotated with respect to the first plate about the horizontal axes of the respective horizontal arms to achieve the first angle between the axes of the upper and lower washers.

5. Apparatus as in claim 1, wherein the shaft comprises an upper portion and a lower portion, the first horizontal arm being mounted on the upper portion, the second horizontal arm being mounted on the lower portion, the upper and lower portions being rotatable with respect to each other about the longitudinal axis of the shaft, whereby a projection of the first horizontal arm on a horizontal plane forms a second angle in the horizontal plane with respect to a projection of the second horizontal arm on the horizontal plane.

6. Apparatus as in claim 5, further comprising;

an upper plate mounted on the lower end of the upper portion of the rotatable shaft;

a lower plate mounted on the upper end of the lower portion of the rotatable shaft;

the upper and lower plates of the rotatable shaft each comprising an arcuate slot adjacent its periphery and an aperture opposite thereto, the upper and lower plates of the rotatable shaft being in facing mating relation, the slot of one of the upper and lower plates of the rotatable shaft being in register with the aperture in the other of the upper and lower plates of the rotatable shaft; and means to fasten the upper and lower plates of the rotatable shaft together, said fastening means passing through the mating slots and apertures of the upper and lower plates of the rotatable shaft, whereby the upper plate of the rotatable shaft can be rotated with respect to the lower plate of the rotatable shaft about the longitudinal axis of the rotatable shaft to achieve said second angle in the horizontal plane.

7. Apparatus for washing the generally vertical side surfaces of a vehicle moving in a selected direction through a car wash, comprising:

a rotatable shaft having a longitudinal vertical axis;

a pair of horizontal arms each having a longitudinal axis, one of the horizontal arms being mounted at one end thereof to the shaft adjacent the upper end of the shaft, the other of the horizontal arms being mounted at one end thereof to the shaft adjacent the lower end of the shaft, the horizontal arms making projections on a horizontal plane, the arms being rotatable with the shaft to individual positions generally parallel to the selected direction, the projection on the horizontal plane of one of the horizontal arms leading the projection on the horizontal plane of the other of the horizontal arms in the selected direction by a first selected angle measured in the horizontal plane;

a washer supported by each of the horizontal arms at the other end thereof, each washer having an upper end and a lower end and a longitudinal axis, each washer being rotatable about the longitudinal axis thereof, each of the pair of horizontal arms comprising a portion rotatable about its respective longitudinal axis, whereby the other end of each of the horizontal arms is rotatable with respect to the one end thereof to tilt the longitudinal axes of the washers to achieve a second selected angle therebetween; and means to independently rotate each of the washers about the longitudinal axes thereof.

8. Apparatus as in claim 7, further comprising:

means to rotate the upper end of the shaft with respect to the lower end of the shaft to achieve the first selected angle in the horizontal plane.

9. Apparatus as in claim 8, further comprising means to rotate the other ends of each of the horizontal arms with respect to the one ends thereof about the longitudinal axes of the horizontal arms to tilt the longitudinal axes of the washers to achieve the second selected angle between the longitudinal axes of the washers.

* * * * *